United States Patent
Yamamoto

(10) Patent No.: US 12,479,382 B2
(45) Date of Patent: Nov. 25, 2025

(54) PEDESTRIAN CONTACT DETECTION APPARATUS FOR VEHICLE

(71) Applicant: SUBARU CORPORATION, Tokyo (JP)

(72) Inventor: Kentaro Yamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 387 days.

(21) Appl. No.: 18/313,715

(22) Filed: May 8, 2023

(65) Prior Publication Data
US 2023/0391282 A1 Dec. 7, 2023

(30) Foreign Application Priority Data
Jun. 2, 2022 (JP) ................................ 2022-090126

(51) Int. Cl.
*B60R 19/48* (2006.01)
*B60R 19/02* (2006.01)
(Continued)

(52) U.S. Cl.
CPC .......... *B60R 19/483* (2013.01); *B60R 19/023* (2013.01); *B60R 19/18* (2013.01);
(Continued)

(58) Field of Classification Search
CPC ..... B60R 19/483; B60R 19/023; B60R 19/18; B60R 19/22; B60R 2019/1806; B60R 2019/1886; B60R 2019/1866; B60R 2019/186; B60R 21/34; B60R 2021/0039; B60R 2021/0051; B60R 2021/0053; B60R 2021/343
(Continued)

(56) References Cited

U.S. PATENT DOCUMENTS

| | | | |
|---|---|---|---|
| 8,973,957 B2 * | 3/2015 | Corwin ................... | B60R 19/34 296/187.04 |
| 2014/0312636 A1 * | 10/2014 | Corwin ................... | B60R 19/34 293/133 |

(Continued)

FOREIGN PATENT DOCUMENTS

| | | | | |
|---|---|---|---|---|
| DE | 102005005881 A1 * | 3/2006 | ........... | B60R 19/483 |
| DE | 102012019380 A1 * | 4/2014 | ............ | B60R 19/48 |

(Continued)

*Primary Examiner* — Joseph D. Pape
*Assistant Examiner* — Denise Lynne Esqui
(74) *Attorney, Agent, or Firm* — Rimon P.C.

(57) ABSTRACT

A pedestrian contact detection apparatus, for a vehicle, includes a bumper beam, an absorber, an upper rib, a lower rib, a contact detection sensor, and a cover. The upper rib and the lower rib each protrude from a front face of the absorber toward a vehicle front side and each extend discontinuously in a vehicle width direction. The lower rib is disposed on a vehicle lower side of the upper rib. A pressure tube extends in the vehicle width direction and is disposed between the upper rib and the lower rib. The cover covers a front face of the absorber from the vehicle front side, includes a support having insertion holes through which the upper and lower ribs are disposed, and is disposed on the vehicle front side of and adjacent to the bumper beam. The support supports the pressure tube from a vehicle rear side.

4 Claims, 6 Drawing Sheets

(51) Int. Cl.
   *B60R 19/18*   (2006.01)
   *B60R 19/22*   (2006.01)
(52) U.S. Cl.
   CPC ............... *B60R 2019/1806* (2013.01); *B60R 2019/1886* (2013.01); *B60R 19/22* (2013.01)
(58) Field of Classification Search
   USPC ............ 293/120, 132, 102, 117; 296/187.04, 296/187.09
   See application file for complete search history.

(56) References Cited

U.S. PATENT DOCUMENTS

| | | | |
|---|---|---|---|
| 2018/0265024 A1* | 9/2018 | Syvertsen | ............ B60R 21/0136 |
| 2021/0268979 A1* | 9/2021 | Yanagisawa | ........ B60R 21/0136 |
| 2023/0288277 A1* | 9/2023 | Inamura | ................ B60R 19/483 |

FOREIGN PATENT DOCUMENTS

| | | | | |
|---|---|---|---|---|
| DE | 102015223547 A1 * | 6/2017 | ........... | B60R 19/023 |
| JP | 2019-051937 A | 4/2019 | | |

\* cited by examiner

PEDESTRIAN CONTACT DETECTION APPARATUS FOR VEHICLE

CROSS-REFERENCE TO RELATED APPLICATIONS

The present application claims priority from Japanese Patent Application No. 2022-090126 filed on Jun. 2, 2022, the entire contents of which are hereby incorporated by reference.

BACKGROUND

The disclosure relates to a pedestrian contact detection apparatus for a vehicle.

A vehicle is provided with a pedestrian contact detection apparatus at a front end. The pedestrian contact detection apparatus is configured to detect contact of a pedestrian with the vehicle. For example, the pedestrian contact detection apparatus includes a foam member (an absorber), a bumper support (a bumper beam), and a detection tube (a pressure tube). The foam member is disposed on the front side of and adjacent to the bumper support. The detection tube is disposed in a groove provided on a front face of the foam member. For example, reference is made to Japanese Unexamined Patent Application Publication (JP-A) No. 2019-051937. Upon frontal contact between the vehicle and a pedestrian, a contact load toward the rear side of the vehicle is applied to the detection tube by the bumper cover, and the detection tube is compressed and deformed (pressed and deformed) in a front-rear direction by the bumper cover and the foam member. This changes pressure inside the detection tube. The pedestrian contact detection apparatus detects the contact between the vehicle and the pedestrian based on such a change in pressure inside the detection tube.

SUMMARY

An aspect of the disclosure provides a pedestrian contact detection apparatus, for a vehicle, that includes a bumper beam, an absorber, an upper rib, a lower rib, a contact detection sensor, and a cover. The bumper beam extends in a vehicle width direction. The vehicle width direction is a width direction of the vehicle. The absorber is disposed on a vehicle front side of and adjacent to the bumper beam and extends in the vehicle width direction. The vehicle front side is a front side of the vehicle. The upper rib protrudes from a front face of the absorber toward the vehicle front side and extends discontinuously in the vehicle width direction. The lower rib is disposed on a vehicle lower side of the upper rib. The lower rib protrudes from the front face of the absorber toward the vehicle front side and extends discontinuously in the vehicle width direction. The vehicle lower side is a lower side of the vehicle. The contact detection sensor includes a pressure tube and is configured to output a signal based on a change in pressure of the pressure tube. The pressure tube extends in the vehicle width direction and is disposed between the upper rib and the lower rib. The cover covers the front face of the absorber from the vehicle front side. The cover includes a support having insertion holes through which the upper rib and the lower rib are disposed. The cover is disposed on the vehicle front side of and adjacent to the bumper beam. The support supports the pressure tube from a vehicle rear side. The vehicle rear side is a rear side of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
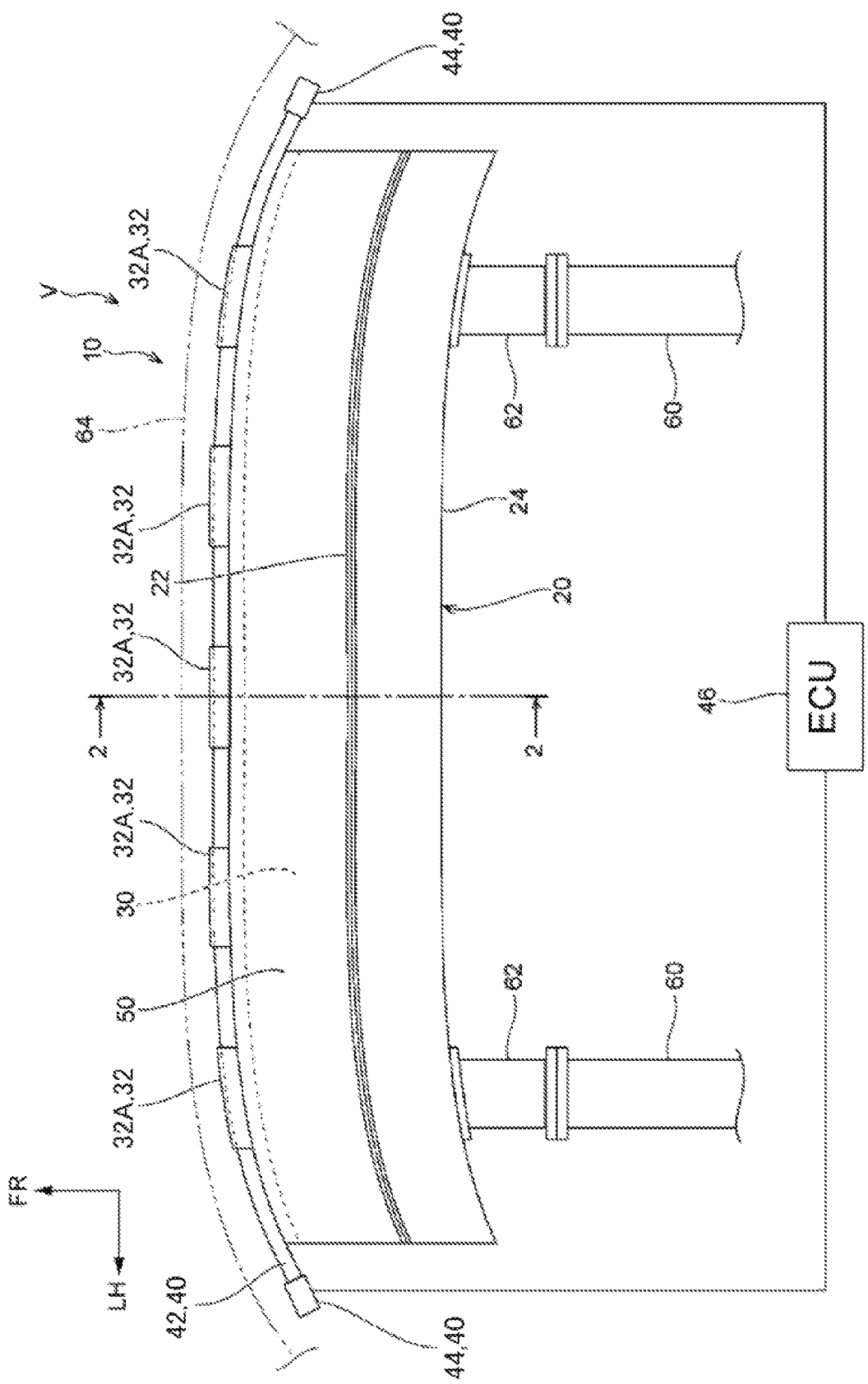
FIG. 1 is a schematic plan diagram illustrating a pedestrian contact detection apparatus according to one example embodiment of the disclosure.

Some existing pedestrian contact detection apparatuses, for example, a pedestrian contact detection apparatus disclosed in JP-A No. 2019-051937, still have room for improvement in terms of the following. In some existing pedestrian contact detection apparatuses, a contact load toward the rear side of a vehicle is applied by a bumper cover to a front end of a foam member and a detection tube. Upon such application of the contact load, the foam member is deformed by the contact load in such a manner that the front end of the foam member shifts toward the rear side. This reduces reaction force, from the foam member, that acts on the detection tube. Accordingly, a deformation amount of the detection tube becomes smaller. Thus, some existing pedestrian contact detection apparatuses still have room for improvement in allowing the detection tube to be favorably deformed upon contact between a vehicle and a pedestrian and thereby detecting the contact between the vehicle and the pedestrian.

It is desirable to provide a pedestrian contact detection apparatus, for a vehicle, that makes it possible to favorably detect contact between the vehicle and a pedestrian.

In the following, a pedestrian contact detection apparatus 10 according to an example embodiment of the disclosure is described with reference to the accompanying drawings. In these drawings, arrows FR, UP, and LH respectively indicate the front side, the upper side, and the left side (one side in a vehicle width direction) of a vehicle V to which the pedestrian contact detection apparatus 10 is applied. The vehicle V may be, for example but not limited to, an automobile. In the following description, an upper-lower direction, a front-rear direction, and a right-left direction refer to an upper-lower direction of the vehicle V, a front-rear direction of the vehicle V, and a right-left direction of the vehicle V, respectively, unless otherwise noted. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
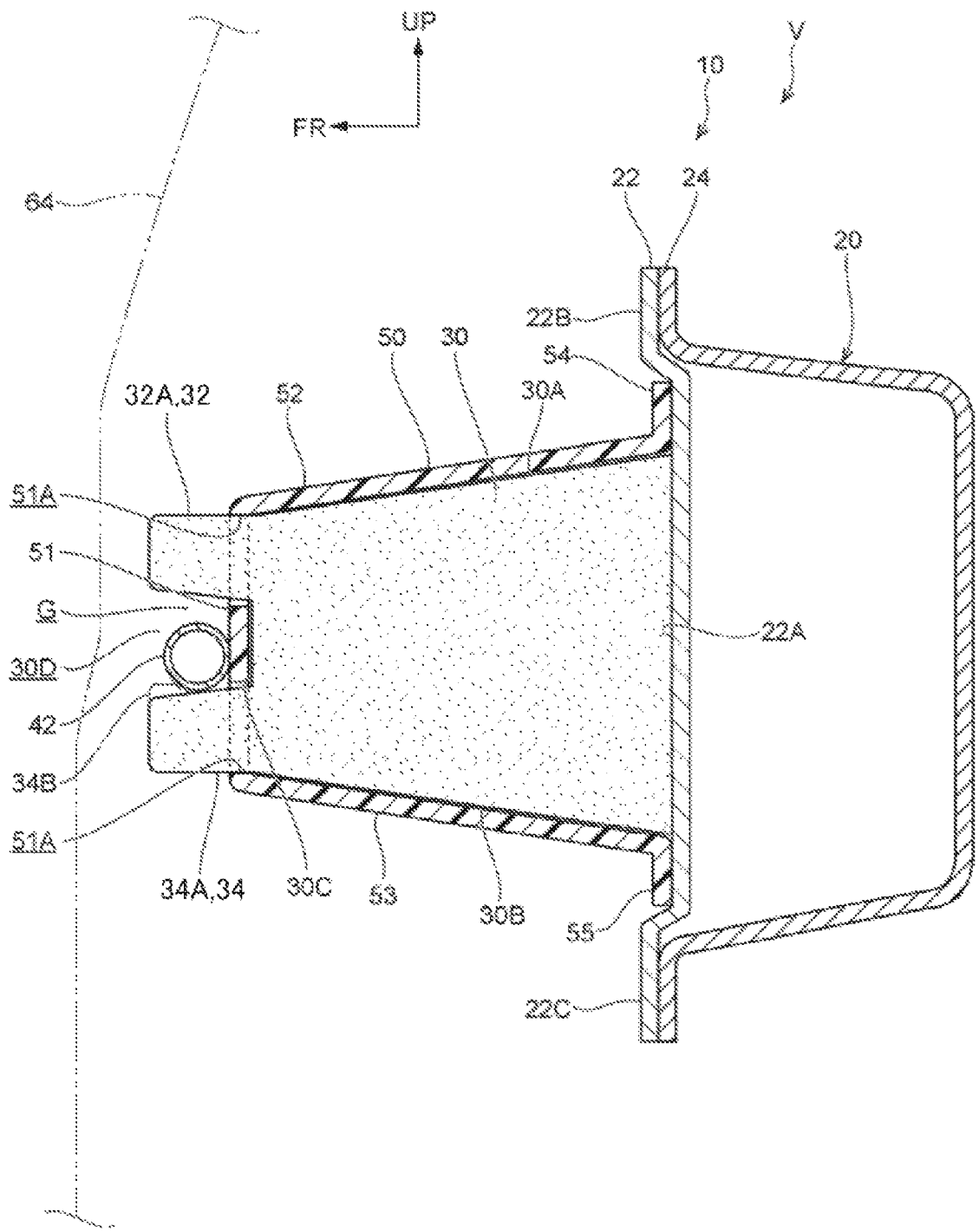
FIG. 2 is an enlarged left cross-sectional diagram illustrating the pedestrian contact detection apparatus illustrated in FIG. 1, taken along a line 2-2 illustrated in FIG. 1.

As illustrated in FIGS. 1 and 2, the pedestrian contact detection apparatus 10 may be disposed at a front end of the vehicle V and may detect contact of the vehicle V with a contact object. The pedestrian contact detection apparatus 10 includes a bumper beam 20, an absorber 30, and a support cover 50. The bumper beam 20 may be a structural member of the vehicle V. The absorber 30 is disposed on the front side of the bumper beam 20. The support cover 50 may be a cover attached to the absorber 30. The pedestrian contact detection apparatus 10 further includes a contact detection sensor 40. Described below are exemplary configurations of these components of the pedestrian contact detection apparatus 10.

[Bumper Beam 20]

The bumper beam 20 may extend in the right-left direction, i.e., a vehicle width direction. The bumper beam 20 may have a substantially rectangular closed cross-sectional shape in a cross sectional view as viewed in a longitudinal direction of the bumper beam 20. The bumper beam 20 may include a front panel 22 and a rear panel 24. The front panel 22 may be a portion of a front end of the bumper beam 20. The rear panel 24 may be a rear portion of the bumper beam 20.

The front panel 22 may include a metal plate member. The front panel 22 may have a thickness direction matching the front-rear direction and may extend in the right-left direction. The front panel 22 may have a recessed portion 22A in a middle portion of the front panel 22 in the upper-lower direction. The recessed portion 22A may be recessed by one step toward the rear side. An upper portion, of the front panel 22, on the upper side of the recessed portion 22A may correspond to an upper flange 22B, and a lower portion, of the front panel 22, on the lower side of the recessed portion 22A may correspond to a lower flange 22C.

As with the front panel 22, the rear panel 24 may include a metal plate member and may extend in the right-left direction. The rear panel 24 may have a substantially hat shape that opens toward the front side as viewed in a longitudinal direction of the rear panel 24. The rear panel 24 may have an upper end joined to the upper flange 22B of the front panel 22, and a lower end joined to the lower flange 22C of the front panel 22.

Paired front side frames 60 on the left side and on the right side may be provided on the rear side of the bumper beam 20. The front side frames 60 may be structural members of the vehicle V. The front side frames 60 may each extend in the front-rear direction. Opposite ends of the bumper beam 20 in the vehicle width direction may be joined to respective front ends of the front side frames 60 with respective crash boxes 62 interposed therebetween.

[Absorber 30]

The absorber 30 may include a resin foam material such as urethane foam. The absorber 30 may have a substantially elongated shape having a longitudinal direction matching the right-left direction. The absorber 30 may be disposed on the front side of and adjacent to the recessed portion 22A of the bumper beam 20. The absorber 30 may have a substantially trapezoidal shape in a cross-sectional view in the longitudinal direction. For example, the absorber 30 may have an upper face 30A that slightly inclines toward the upper side as the upper face 30A extends toward the rear side, as viewed in the right-left direction. The absorber 30 may have a lower face 30B that slightly inclines toward the lower side as the lower face 30B extends toward the rear side, as viewed in the right-left direction. The absorber 30 may have a rear face fixed to a front face of the recessed portion 22A of the bumper beam 20.

Figure 3:
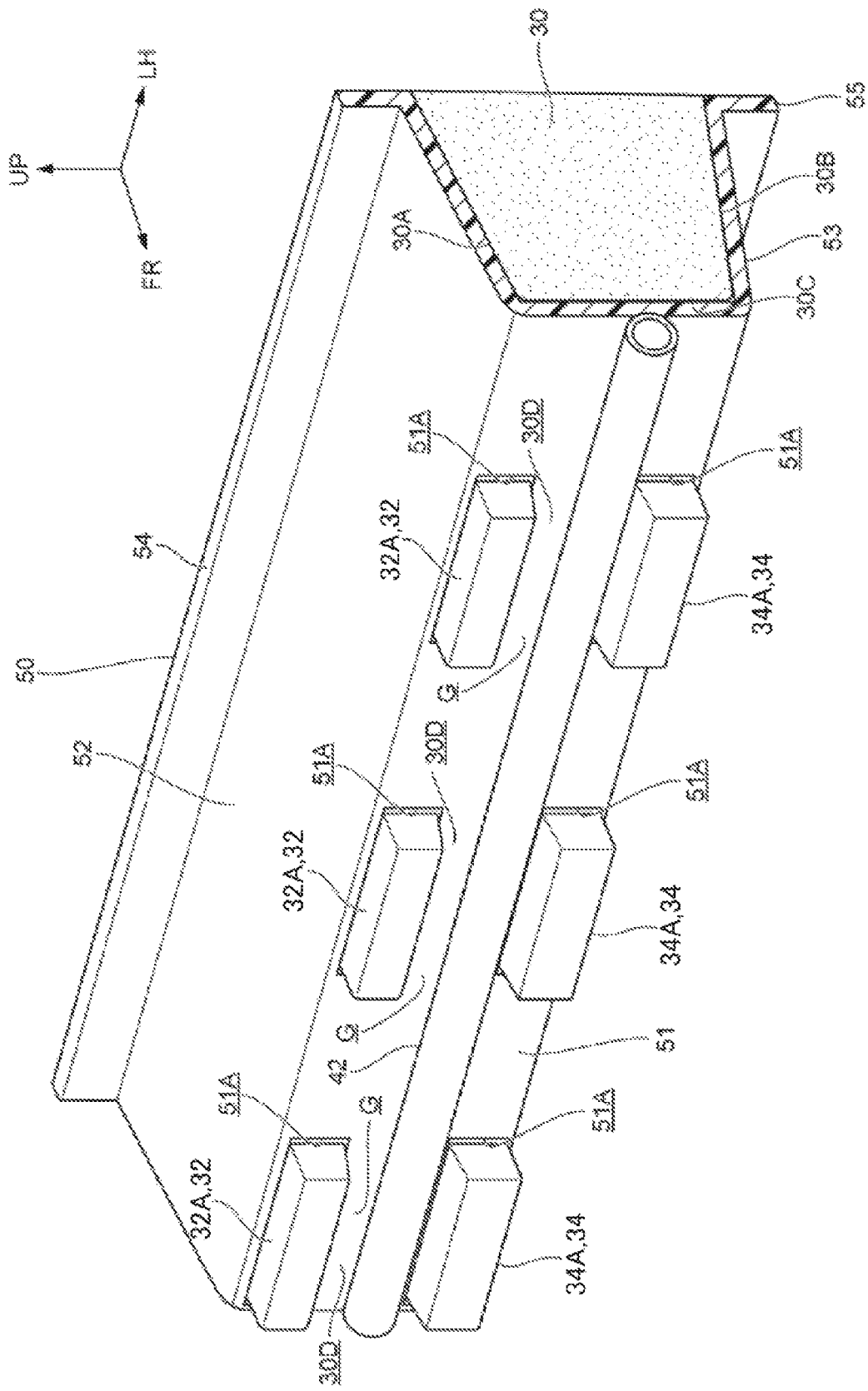
FIG. 3 is a perspective diagram illustrating a state of attachment of a support cover illustrated in FIG. 2 to an absorber, with a sectional view in part.

As illustrated in FIG. 3, an upper rib 32 may be provided at an upper end of a front face 30C of the absorber 30. The upper rib 32 may be permanently affixed to the absorber 30. The upper rib 32 may have a rib shape having a thickness direction that matches the upper-lower direction and extending in the right-left direction. The upper rib 32 may extend discontinuously in the right-left direction. The upper rib 32 may include a plurality of upper rib members 32A. The upper rib members 32A may each have a substantially cuboid block shape having a longitudinal direction that matches the right-left direction. The upper rib members 32A may be arranged discontinuously in the right-left direction. In other words, the upper rib members 32A may be disposed side by side in the right-left direction at predetermined intervals.

A lower rib 34 may be provided at a lower end of the front face 30C of the absorber 30, on the lower side of the upper rib 32. The lower rib 34 may be permanently affixed to the absorber 30. As with the upper rib 32, the lower rib 34 may have a rib shape having a thickness direction that matches the upper-lower direction and extending in the right-left direction. The lower rib 34 may extend discontinuously in the right-left direction. The lower rib 34 may include a plurality of lower rib members 34A. The lower rib members 34A may each have a substantially cuboid block shape extending in the right-left direction. The lower rib members 34A may be arranged discontinuously in the right-left direction. In other words, the lower rib members 34A may be disposed side by side in the right-left direction at predetermined intervals.

The upper rib members 32A and the lower rib members 34A may have substantially the same thickness dimensions (i.e., substantially the same dimensions in the upper-lower direction), substantially the same dimensions in the right-left direction, and substantially the same dimensions in the front-rear direction. That is, in the example embodiment, the upper rib members 32A and the lower rib members 34A may have substantially the same shapes, and may have substantially the same rigidity. In addition, the positions of the upper rib members 32A in the right-left direction and the positions of the lower rib members 34A in the right-left direction may be substantially the same. That is, the upper rib members 32A and the lower rib members 34A may be opposed to each other with predetermined gaps therebetween in the upper-lower direction. A region (a space) between each of the upper rib members 32A and the corresponding one of the lower rib members 34A of the absorber 30 may serve as a tube containing part 30D that is to contain a pressure tube 42. The pressure tube 42 will be described later.

A bumper cover 64 may be provided on the front side of the absorber 30. The bumper cover 64 may be a portion of a front end of the vehicle V. The bumper cover 64 may extend in the vehicle width direction and may be fixed to a body of the vehicle V at a predetermined but unillustrated position. The absorber 30 may thus be covered with the bumper cover 64 from the front side.

[Contact Detection Sensor 40]

The contact detection sensor 40 may include the pressure tube 42 and a pressure sensor 44 that outputs a signal based on a change in pressure of the pressure tube 42. In a broad sense, the pressure sensor 44 may be regarded as a pressure detector.

The pressure tube 42 may have an elongated shape having a longitudinal direction that matches the right-left direction. The pressure tube 42 may include a hollow structure having a substantially annular cross-sectional shape. The pressure tube 42 may be contained in the tube containing part 30D of the absorber 30. For example, the pressure tube 42 may be disposed on the upper side of the lower rib 34, adjacent to the lower rib 34, on the lower side of the upper rib 32, and away from the upper rib 32. That is, the pressure tube 42 may have a diameter smaller than a dimension of the tube containing part 30D in the upper-lower direction, and a gap G may be present between the upper rib 32 and the pressure tube 42. The gap G may have a predetermined dimension in the upper-lower direction, which may be set to suppress deformation of the pressure tube 42 upon contact between the vehicle V and a contact object other than a pedestrian.

The pressure sensor 44 may be provided at each of opposite ends of the pressure tube 42 in the longitudinal direction, and may be fixed to the body of the vehicle V at a non-illustrated position. The pressure sensor 44 may be electrically coupled to an ECU 46. In a broad sense, the ECU 46 may be regarded as a contact determination unit. When the pressure tube 42 is deformed, the pressure sensor 44 may output, to the ECU 46, the signal based on a change in pressure inside the pressure tube 42.

Based on the signal outputted from the pressure sensor 44, the ECU 46 may calculate a value of the change in pressure inside the pressure tube 42, determine whether the value of the change in pressure is greater than a threshold, and thereby determine whether a contact object in contact with the bumper cover 64 is a pedestrian or a contact object other than a pedestrian, such as a small animal. For example, if the value of the change in pressure inside the pressure tube 42 is greater than or equal to the threshold, the ECU 46 may determine that the contact object is a pedestrian. If the value of the change in pressure inside the pressure tube 42 is less than the threshold, the ECU 46 may determine that the contact object is an object other than a pedestrian.

[Support Cover 50]

The support cover 50 may be disposed on the front side of and adjacent to the bumper beam 20 in such a manner as to cover the absorber 30 from the front side. The support cover 50 may extend in the right-left direction. The support cover 50 may have a substantially hat shape that opens toward the rear side as viewed in a longitudinal direction of the support cover 50. For example, the support cover 50 may include a support plate 51, an upper wall 52, a lower wall 53, a rear flange 54, and a rear flange 55. The support plate 51 may serve as a support having a thickness direction that matches the front-rear direction. The upper wall 52 may extend from an upper end of the support plate 51 toward the rear side. The lower wall 53 may extend from a lower end of the support plate 51 toward the rear side. The rear flange 54 may extend from a rear end of the upper wall 52 toward the upper side. The rear flange 54 may be a portion of a rear end of the support cover 50. The rear flange 55 may extend from a rear end of the lower wall 53 toward the lower side. The rear flange 55 may be a portion of the rear end of the support cover 50.

The upper wall 52 may slightly incline toward the upper side as the upper wall 52 extends toward the rear side, along the upper face 30A of the absorber 30. The upper wall 52 may be disposed on the upper side of and adjacent to the upper face 30A. The lower wall 53 may slightly incline toward the lower side as the lower wall 53 extends toward the rear side, along the lower face 30B of the absorber 30. The lower wall 53 may be disposed on the lower side of and adjacent to the lower face 30B. The rear flange 54 may be disposed on the front side of the bumper beam 20, adjacent to the bumper beam 20, on the lower side of the upper flange 22B of the bumper beam 20, and adjacent to the upper flange 22B. The rear flange 55 may be disposed on the front side of the bumper beam 20, adjacent to the bumper beam 20, on the upper side of the lower flange 22C of the bumper beam 20, and adjacent to the lower flange 22C. That is, the rear end of the support cover 50 may be sandwiched by the recessed portion 22A of the bumper beam 20 from an outer side in the upper-lower direction. Thus, a movement of the support cover 50 toward the rear side may be limited by the bumper beam 20, and shifting of the rear end of the support cover 50 in the upper-lower direction may be limited by the recessed portion 22A. The support cover 50 may not be fixed to the absorber 30. For example, when the absorber 30 is compressed and deformed in the front-rear direction, the absorber 30 may shift relative to the support cover 50.

The support plate 51 may have insertion holes 51A at respective positions corresponding to the upper rib members 32A and at respective positions corresponding to the lower rib members 34A. The insertion holes 51A may be provided through the support plate 51. The insertion holes 51A may each have a substantially rectangular long hole shape having a longitudinal direction that matches the right-left direction. Such a substantially rectangular long hole shape may correspond to the shape of each of the upper rib members 32A and the lower rib members 34A. The upper rib members 32A and the lower rib members 34A may be disposed through the respective insertion holes 51A. The support plate 51 may be disposed on the front side of and adjacent to the front face 30C of the absorber 30. The pressure tube 42 described above may be disposed on the front side of and adjacent to the support plate 51. The diameter of the pressure tube 42 may be so set that the pressure tube 42 does not protrude toward the front side relative to the upper rib 32 and the lower rib 34. That is, the support plate 51 may serve as a support that supports the pressure tube 42 from the rear side.

The support cover 50 may include a hard synthetic resin material, and may have predetermined rigidity in the front-rear direction. For example, the support cover 50 may be so configured, upon contact between the vehicle V and a pedestrian, that the support cover 50 is not plastically deformed and performance of the support cover 50 (the support plate 51) supporting the pressure tube 42 is secured.

[Workings and Effects]

Now, workings and effects of the example embodiment of the disclosure are described together with exemplary operations of the pedestrian contact detection apparatus 10 at the time of frontal contact between the vehicle V and a pedestrian.

Figure 4:
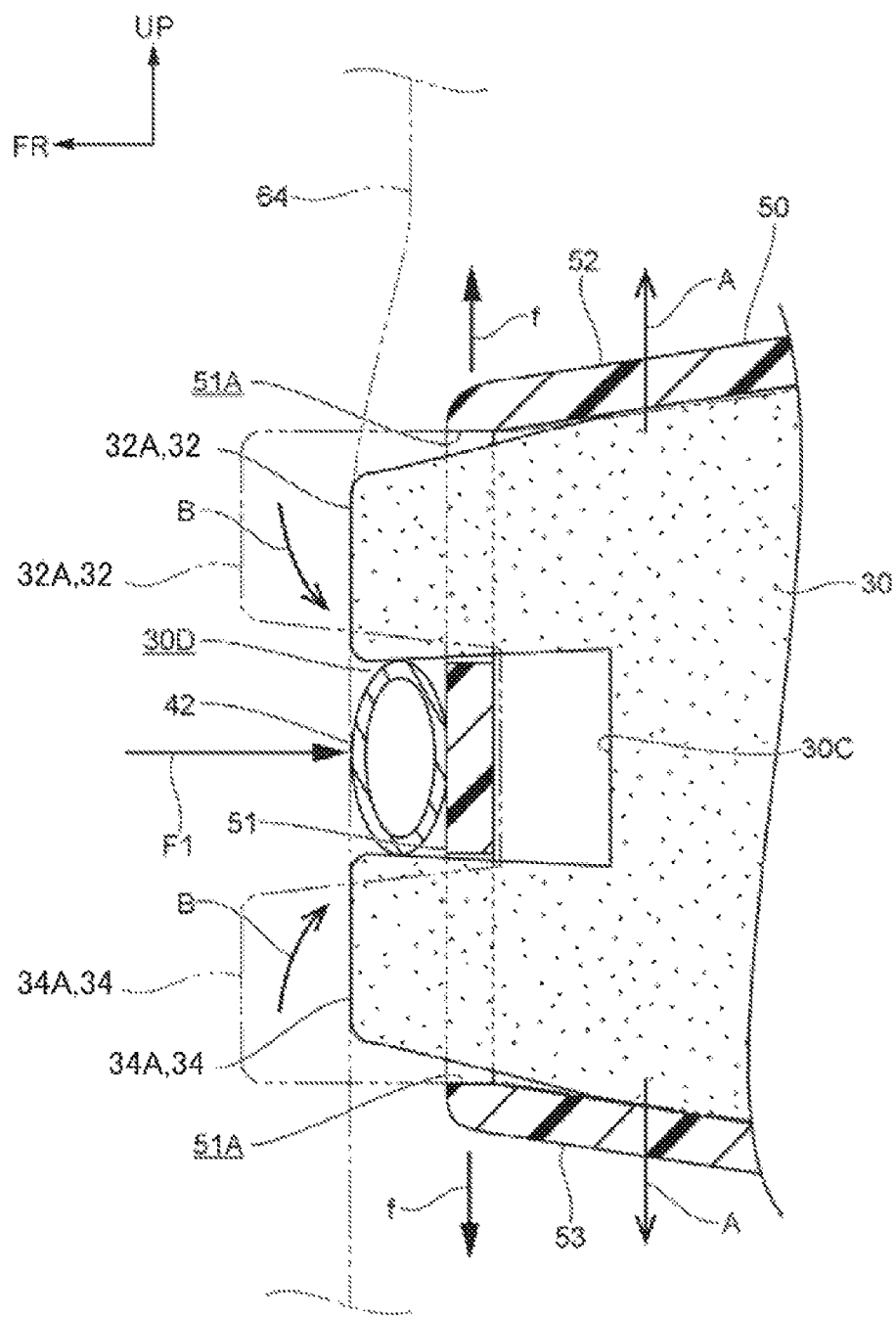
FIG. 4 is a cross-sectional diagram corresponding to FIG. 3 and schematically illustrating an exemplary operation of the pedestrian contact detection apparatus at the time of frontal contact between a vehicle and a pedestrian.

As illustrated in FIG. 4, upon frontal contact between the vehicle V and a pedestrian, the pedestrian's leg may come into contact with the bumper cover 64, a contact load F1 toward the rear side may be applied to the bumper cover 64, and the bumper cover 64 may shift toward the rear side. The bumper cover 64 may thus press the front end of the absorber 30, i.e., the upper rib 32 and the lower rib 34. As a result, the absorber 30 may be compressed and deformed in the front-rear direction in such a manner that the front end of the absorber 30 including the upper rib 32 and the lower rib 34 shifts toward the rear side.

The rear flange 54 and the rear flange 55 of the support cover 50 may be disposed on the front side of and adjacent to the bumper beam 20. The movement of the support cover 50 toward the rear side may thus be limited by the bumper beam 20. In addition, the support cover 50 may not be fixed to the absorber 30. Therefore, the absorber 30 may be deformed in such a manner that the upper rib 32 and the lower rib 34 shift toward the rear side relative to the support plate 51 of the support cover 50. In addition, upon such deformation of the absorber 30, the bumper cover 64 may press the pressure tube 42 while the performance of the support plate 51 supporting the pressure tube 42 is maintained. As a result, the pressure tube 42 may be sandwiched by the bumper cover 64 and the support cover 50 in the front-rear direction, and thus be compressed and deformed.

When the absorber 30 is compressed and deformed in the front-rear direction, the absorber 30 may be so deformed as to expand outward in the upper-lower direction, as indicated by an arrow A in FIG. 4. Accordingly, the upper rib 32 and the lower rib 34 of the absorber 30 may shift inward in the upper-lower direction, as indicated by an arrow B in FIG. 4. That is, the lower rib 34 may shift toward the upper side together with the pressure tube 42, and the upper rib 32 may shift toward the lower side. In other words, the upper rib 32 and the lower rib 34 may come closer to each other and thus sandwich the pressure tube 42 from both sides in the upper-lower direction. As a result, the pressure tube 42 may be compressed and deformed in the upper-lower direction. In such a manner, the pressure tube 42 may be compressed and deformed in the front-rear direction and the upper-lower direction upon contact between the vehicle V and a pedestrian. It is therefore possible to increase a deformation amount of the pressure tube 42 upon contact between the vehicle V and a pedestrian, and to increase a change in pressure inside the pressure tube 42. As a result, the ECU 46 may detect that the contact object in contact with the bumper cover 64 is a pedestrian.

Figure 5:
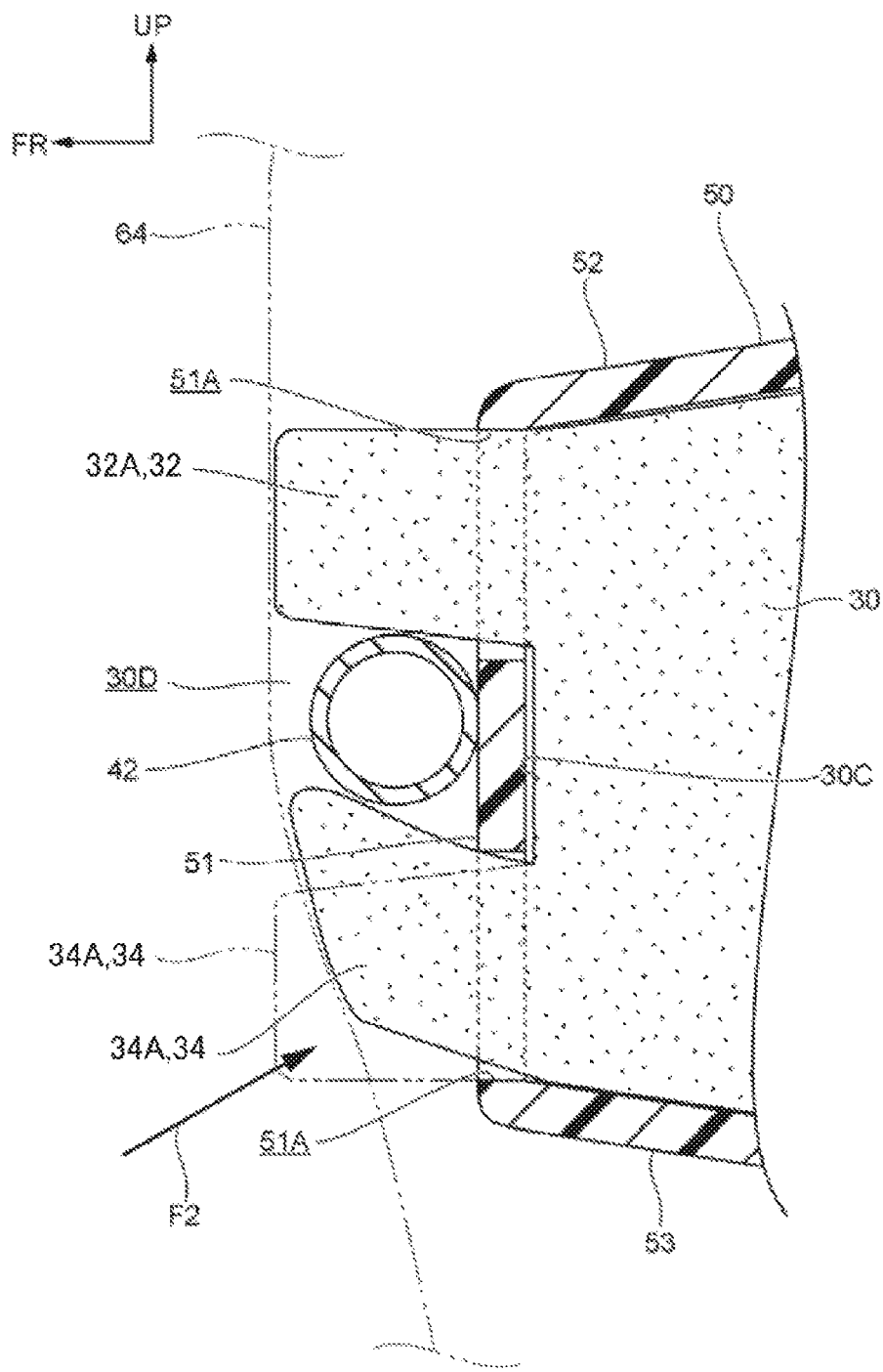
FIG. 5 is a cross-sectional diagram corresponding to FIG. 3 and schematically illustrating an exemplary operation of the pedestrian contact detection apparatus at the time of frontal contact between the vehicle and a contact object other than a pedestrian.

Upon frontal contact between the vehicle V and a contact object other than a pedestrian, such as a small animal, the contact object may come into contact with a lower portion of the bumper cover 64. In this case, as illustrated in FIG. 5, a contact load F2 in an oblique direction toward the upper-rear side may be mainly applied to the bumper cover 64 and the front end (the lower rib 34) of the absorber 30. When the contact load F2 is applied to the lower rib 34 of the absorber 30, the lower rib 34 may shift in an oblique direction toward the upper-rear side while being pressed and deformed. Such shifting of the lower rib 34 may cause the pressure tube 42 to move toward the upper side in the tube containing part 30D. However, because the gap G is present between the pressure tube 42 and the upper rib 32, the shifting of the pressure tube 42 toward the upper side may be absorbed by the gap G. This may help to prevent the pressure tube 42 from being compressed and deformed in the upper-lower direction by the upper rib 32 and the lower rib 34. It is therefore possible to reduce the deformation amount of the pressure tube 42 at the time of contact between the vehicle V and a contact object other than a pedestrian and to reduce a change in pressure inside the pressure tube 42. As a result, the ECU 46 may detect that the contact object in contact with the bumper cover 64 is an object other than a pedestrian, such as a small animal.

As described above, in the pedestrian contact detection apparatus 10 according to the example embodiment, the upper rib members 32A and the lower rib members 34A may be arranged on the front face 30C of the absorber 30 discontinuously in the right-left direction. In addition, the pressure tube 42 may be provided between the upper rib 32 and the lower rib 34. The upper rib 32 and the lower rib 34 may be disposed through the insertion holes 51A of the support plate 51 of the support cover 50. The support plate 51 may cover the front face of the absorber 30 from the front side. The support plate 51 may support the pressure tube 42 from the rear side. The rear flange 54 and the rear flange 55 which are portions of the rear end of the support cover 50 may be disposed on the front side of and adjacent to the bumper beam 20. Thus, as described above, upon fontal contact between the vehicle V and a pedestrian, even if the contact load F1 toward the rear side is applied to the upper rib 32 and the lower rib 34 of the absorber 30, and even if the front end of the absorber 30 shifts toward the rear side in accordance with compression and deformation of the absorber 30, it is possible to limit, by the bumper beam 20, the movement of the support cover 50 (the support plate 51) toward the rear side. That is, it is possible to maintain the performance of the support plate 51 supporting the pressure tube 42. This makes it possible to allow reaction force from the support plate 51 to effectively act on the pressure tube 42. As a result, it is possible to allow the pressure tube 42 to be favorably compressed and deformed in the front-rear direction by the bumper cover 64 and the support plate 51 and to increase the deformation amount of the pressure tube 42. It is thus possible to favorably detect contact between the vehicle V and a pedestrian.

The upper wall 52 of the support cover 50 may extend from the upper end of the support plate 51 toward the rear side, and may be disposed on the upper side of and adjacent to the absorber 30. In addition, the lower wall 53 of the support cover 50 may extend from the lower end of the support plate 51 toward the rear side, and may be disposed on the lower side of and adjacent to the absorber 30. Accordingly, as described above, when the contact load F1 toward the rear side is applied to the front end of the absorber 30 and the absorber 30 expands outward in the upper-lower direction, the front end of the absorber 30 may press the upper wall 52 and the lower wall 53 of the support cover 50 outward in the upper-lower direction. This may cause tensile force f indicated in FIG. 4 to act on the support plate 51 of the support cover 50 outward in the upper-lower direction. As a result, it is possible to allow the reaction force toward the front side from the support plate 51 to further effectively act on the pressure tube 42 upon frontal contact between the vehicle V and a pedestrian. It is thus possible to allow the pressure tube 42 to be further favorably compressed and deformed in the front-rear direction.

In addition, as described above, the upper wall 52 of the support cover 50 may be disposed on the upper side of and adjacent to the absorber 30. The lower wall 53 of the support cover 50 may be disposed on the lower side of and adjacent to the absorber 30. This makes it possible to favorably maintain an attachment state of the support cover 50 after the support cover 50 is attached to the absorber 30 in an unfixed manner.

In addition, the rear flange 54 of the support cover 50 may be disposed on the front side of and adjacent to the upper end of the recessed portion 22A of the bumper beam 20. The rear flange 55 of the support cover 50 may be disposed on the front side of and adjacent to the lower end of the recessed portion 22A of the bumper beam 20. This makes it possible to suppress, by the recessed portion 22A of the bumper beam 20, opening of the rear end of the support cover 50 outward in the upper-lower direction. Accordingly, it is possible to suppress shifting of the support plate 51 toward the rear side while favorably supporting the support cover 50 by the bumper beam 20. As a result, it is possible to favorably maintain the performance of the support plate 51 supporting the pressure tube 42.

Figure 6:
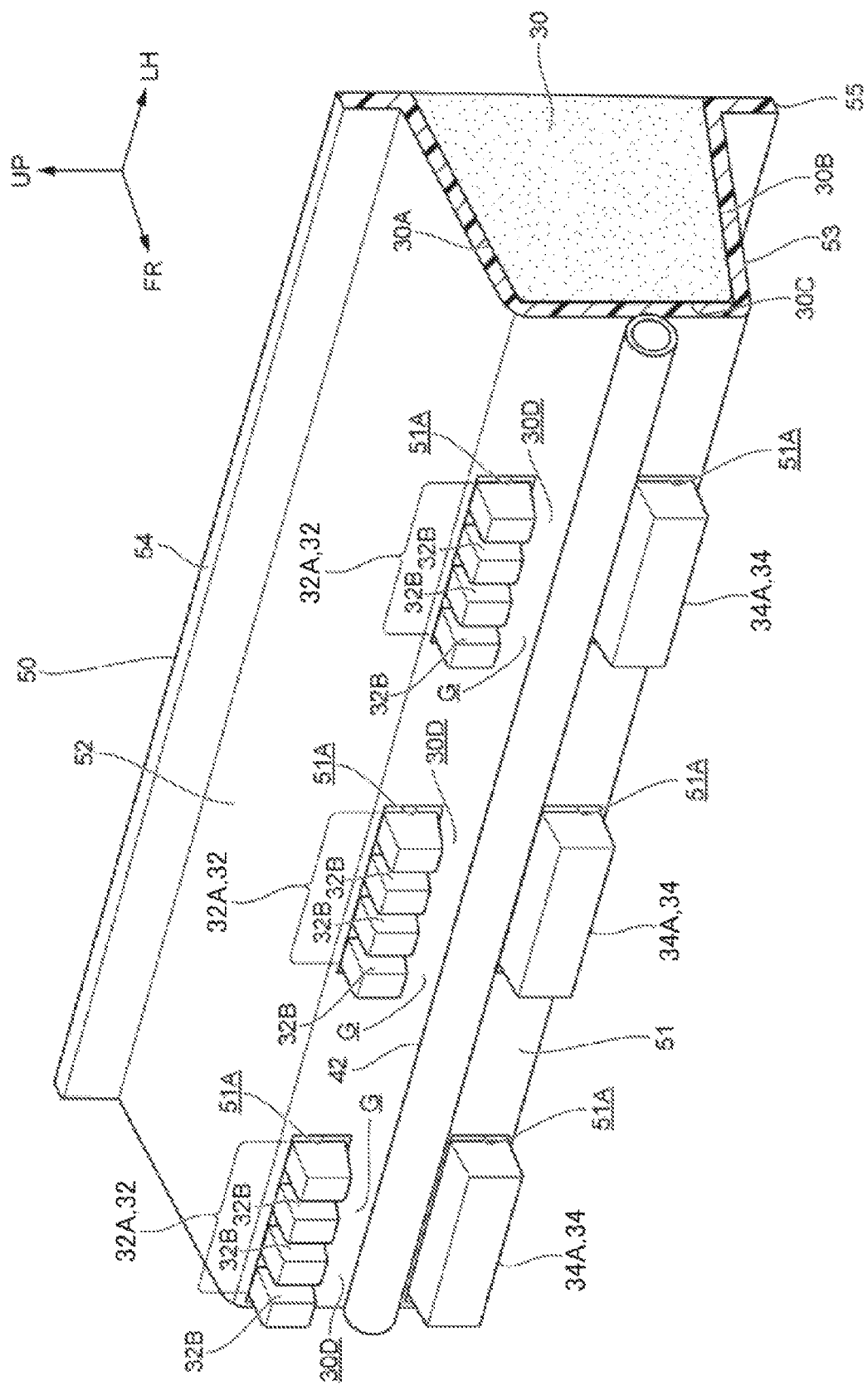
FIG. 6 is a perspective diagram corresponding to FIG. 3 and illustrating a modification of an upper rib of the absorber illustrated in FIG. 3.

In the example embodiment, the respective shapes of the upper rib 32 and the lower rib 34 of the absorber 30 may be so set that the upper rib 32 and the lower rib 34 have substantially equal flexural rigidity. Alternatively, in one example, the flexural rigidity of the upper rib 32 may be lower than that of the lower rib 34. For example, although not illustrated, the flexural rigidity of the upper rib 32 may be set to be lower than that of the lower rib 34 by setting the dimension of the upper rib 32 in the right-left direction or the upper-lower direction to be smaller than that of the lower rib 34. Alternatively, in another example, as described in FIG. 6, the flexural rigidity of the upper rib 32 may be set to be lower than that of the lower rib 34 by providing slits 32B in the upper rib members 32A of the upper rib 32. The slits 32B may extend in the upper-lower direction or the right-left direction. FIG. 6 illustrates an example where the upper rib members 32A have the slits 32B extending in the upper-lower direction. This makes it possible to further increase the deformation amount of the pressure tube 42 upon contact between the vehicle V and a pedestrian.

That is, as described above, upon frontal contact between the vehicle V and a pedestrian, the pedestrian's leg may come into contact with the bumper cover 64, which may cause the bumper cover 64 to shift toward the rear side and thus apply the contact load F1 toward the rear side from the bumper cover 64 to the front end (i.e., the upper rib 32 and the lower rib 34) of the absorber 30. After the pedestrian's leg comes into contact with the bumper cover 64, the pedestrian may fall down on a hood of the vehicle V. Therefore, the direction of the contact load F1 may change to an oblique direction toward the lower-rear side, and the contact load F1 in the oblique direction toward the lower-rear side may be mainly applied to the upper rib 32. In the example illustrated in FIG. 6, because the flexural rigidity of the upper rib 32 is set to be lower than that of the lower rib 34, it is possible to easily cause the upper rib 32 to shift in the oblique direction toward the lower-rear side by the contact load F1 in the oblique direction toward the lower-rear side. It is thus possible to favorably push and deform the pressure tube 42 in the upper-lower direction by the upper rib 32 and the lower rib 34. Accordingly, it is possible to further increase the deformation amount of the pressure tube 42 upon contact between the vehicle V and a pedestrian.

In the example embodiment, the rear flange 54 and the rear flange 55 of the support cover 50 may be disposed in the recessed portion 22A of the bumper beam 20, and shifting of the rear flange 54 and the rear flange 55 outward in the upper-lower direction may be limited by the recessed portion 22A. However, alternatively, in one example, the rear flange 54 and the rear flange 55 of the support cover 50 may be fixed to the bumper beam 20 by a member such as a fastening member. In such an example, the recessed portion 22A of the bumper beam 20 may be omitted.

In the example embodiment, the pressure tube 42 may be disposed on the upper side of and adjacent to the rear flange 55. However, alternatively, in one example, the pressure tube 42 may be disposed in the middle portion of the tube containing part 30D in the upper-lower direction. For example, ribs may be provided on upper surfaces of the lower rib members 34A to thereby dispose the pressure tube 42 in the middle portion of the tube containing part 30D in the upper-lower direction.

In one example, a protrusion 34B protruding toward the upper side may be provided at a front end of the lower rib member 34A of the absorber 30 in the example embodiment. For the protrusion 34B, see FIG. 2. The movement of the pressure tube 42 toward the front side may thus be limited by the protrusion 34B.

As used herein, the term "collision" may be used interchangeably with the term "contact".

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A pedestrian contact detection apparatus for a vehicle, the pedestrian contact detection apparatus comprising:
    a bumper beam extending in a vehicle width direction, the vehicle width direction being a width direction of the vehicle;
    an absorber disposed on a vehicle front side of and adjacent to the bumper beam and extending in the vehicle width direction, the vehicle front side being a front side of the vehicle;
    an upper rib protruding from a front face of the absorber toward the vehicle front side and extending discontinuously in the vehicle width direction;
    a lower rib disposed on a vehicle lower side of the upper rib, the lower rib protruding from the front face of the absorber toward the vehicle front side and extending discontinuously in the vehicle width direction, the vehicle lower side being a lower side of the vehicle;
    a contact detection sensor comprising a pressure tube and configured to output a signal based on a change in pressure of the pressure tube, the pressure tube extending in the vehicle width direction and being disposed between the upper rib and the lower rib; and
    a cover covering the front face of the absorber from the vehicle front side, the cover comprising a support having insertion holes through which the upper rib and the lower rib are disposed, the cover being disposed on the vehicle front side of and adjacent to the bumper beam, wherein
    the support supports the pressure tube from a vehicle rear side, the vehicle rear side being a rear side of the vehicle.

2. The pedestrian contact detection apparatus according to claim 1, wherein
    the cover comprises
        an upper wall extending from an upper end of the support toward the vehicle rear side and disposed on a vehicle upper side of and adjacent to the absorber, the vehicle upper side being an upper side of the vehicle, and
        a lower wall extending from a lower end of the support toward the vehicle rear side and disposed on the vehicle lower side of and adjacent to the absorber.

3. The pedestrian contact detection apparatus according to claim 1, wherein rigidity of the upper rib is lower than rigidity of the lower rib.

4. The pedestrian contact detection apparatus according to claim 2, wherein rigidity of the upper rib is lower than rigidity of the lower rib.

\* \* \* \* \*